United States Patent [19]
Greshes

[11] Patent Number: 6,074,579
[45] Date of Patent: Jun. 13, 2000

[54] LENS BLANKS AND METHOD OF MAKING A LENS THEREFROM

[76] Inventor: Martin Greshes, 70 Corey La., East Meadow, N.Y. 11729

[21] Appl. No.: 09/103,117

[22] Filed: Jun. 23, 1998

Related U.S. Application Data

[60] Division of application No. 08/858,283, May 19, 1997, which is a continuation-in-part of application No. 08/343,107, Nov. 22, 1994, Pat. No. 5,630,967, which is a continuation-in-part of application No. 07/932,088, Aug. 19, 1992, Pat. No. 5,368,790.

[51] Int. Cl.[7] .................................................. B29D 11/00
[52] U.S. Cl. ............................ 264/1.7; 264/2.4; 264/2.7; 264/1.32
[58] Field of Search .............................. 264/2.3, 2.4, 1.1, 264/2.7, 1.7, 1.32; 425/808

[56] References Cited

U.S. PATENT DOCUMENTS

| | | | |
|---|---|---|---|
| 2,298,429 | 10/1942 | Smith | 264/2.4 |
| 2,304,663 | 12/1942 | Smith et al. | 264/2.4 |
| 2,332,674 | 10/1943 | Smith . | |
| 2,432,668 | 12/1947 | Kingston . | |
| 2,479,935 | 8/1949 | Johnson . | |
| 2,481,809 | 9/1949 | Barnes . | |
| 2,640,227 | 6/1953 | Johnson . | |
| 3,763,290 | 10/1973 | Sheld . | |
| 3,833,289 | 9/1974 | Schuler . | |
| 5,458,820 | 10/1995 | Lefebvre . | |
| 5,718,850 | 2/1998 | Takano et al. . | |
| 5,751,481 | 5/1998 | Dalzell et al. . | |
| 5,851,328 | 12/1998 | Kohan . | |

*Primary Examiner*—Mathieu D. Vargot
*Attorney, Agent, or Firm*—Lackenbach Siegel

[57] ABSTRACT

A method of manufacturing a prescription lens, for eyeglasses on site by compression molding, in a pair of upper and lower molds having a mold surfaces from a thermoplastic preformed lens blank having opposite surfaces and a periphery, comprising the steps of: preheating a preform blank at a first temperature and preheating the upper and lower molds to a second higher temperature; positioning the preheated preform between the upper and lower preheated molds such that the preform makes a single point or line contact with each of the mold surfaces; initially compressing the preformed at a first fixed rate of speed regardless of pressure exerted on the preform, with the preform being compressed to about 4 mm of a predetermined lens thickness desired for the prescription lens; finally compressing the preform to a substantially finished prescription lens at a second fixed rate of speed substantially higher than the first fixed rate of speed regardless of pressure exerted on the preform while substantially maintaining the predetermined temperature, and shutting off the heating to the molds, and stopping travel of the molds with respect to each other upon reaching the predetermined lens thickness; and cooling the molds to another, but lower predetermined temperature; and thereafter opening the molds so as to remove the finished prescription lens.

11 Claims, 4 Drawing Sheets

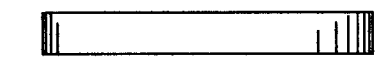
FIG. 1
PRIOR ART LENS BLANK
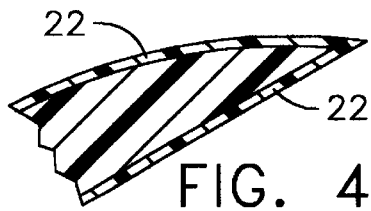
FIG. 4
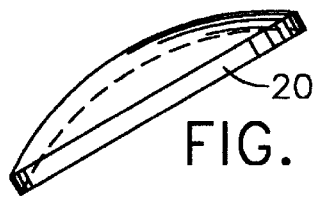
FIG. 2
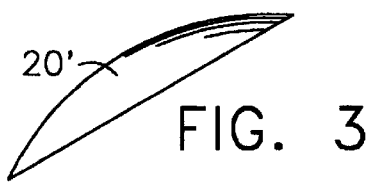
FIG. 3
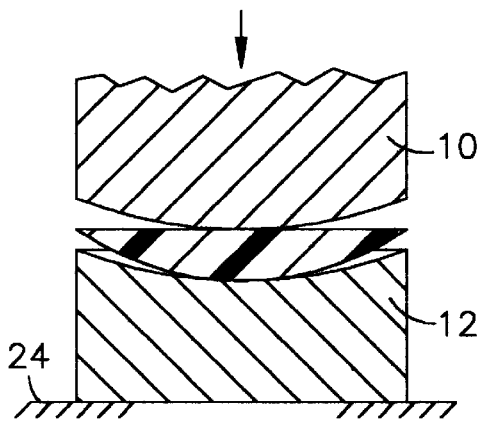
↑ FIG. 5
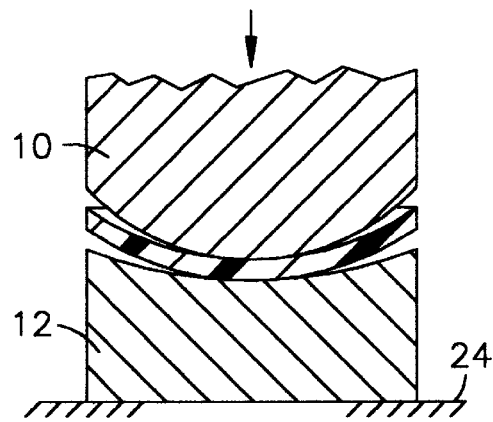
↑ FIG. 7
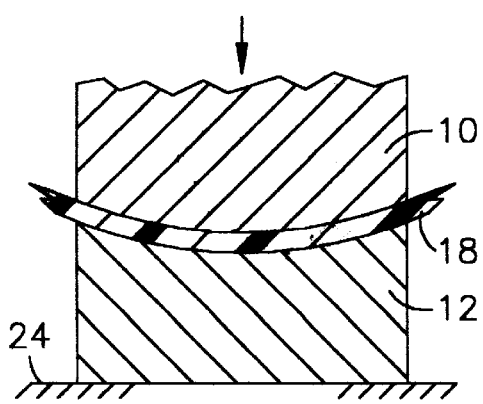
↑ FIG. 6
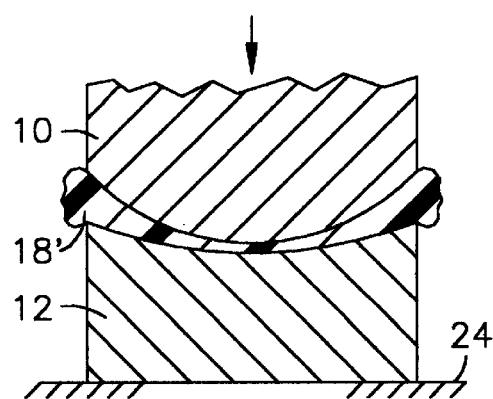
↑ FIG. 8

LENS BLANKS AND METHOD OF MAKING A LENS THEREFROM

RELATED PATENT APPLICATIONS

This application is a divisional patent application of my U.S. Ser. No. 08/858,283, filed May 19, 1997, which in turn is a continuation-in-part of my earlier filed U.S. patent application Ser. No. 08/343,107, filed Nov. 22, 1994, now U.S. Pat. No. 5,630,967, which in turn is a continuation-in-part of my U.S. patent application Ser. No. 07/932,088, filed Aug. 19, 1992, now U.S. Pat. No. 5,368,790.

BACKGROUND OF THE INVENTION

This improved invention relates to lens blanks, and to a method for making a lens and more particularly to a system embodying the cold flow compression molding of a lens between a pair of mold/cavities using a preformed lens blank of thermoplastic material, and of predetermined configuration. The system is particularly applicable for use in house by the optician, optometrist and/or ophthalmologist. The method and apparatus further do not require the use of skilled technicians, and reduces the cost of prescription lenses since they are created substantially defect free, eliminating the need for any middle men, such as a laboratory or lens factory. Moreover, the lens can be fabricated quickly in minutes, so that the patient or customer can be fitted with a pair of prescription glasses in virtually no time, and certainly less time than it takes for an eye examination.

Heretofore in the industry, lenses were traditionally fabricated in a distant wholesale laboratory. A patient or customer has first an eye examination, and then orders new lenses based on the eye examination, and then he must return a week or so later to receive and be fitted with a new pair of glasses with the laboratory fabricated lens. This procedure is not only very time consuming, but also expensive. At times errors are made in the prescription. In such cases, yet another visit is required or the lenses must be returned to the laboratory for further corrective measures or an entirely new set of lenses fabricated, with resulting delays and expense.

Within about the last ten years there has been a trend toward development of the so called eyeglass "Super Stores" or "one hour" laboratories. These types of stores are very expensive to run and operate. They require a huge inventory of blanks, and employ highly trained technicians to operate complex lens grinding machines and other finishing apparatuses required to complete all types of prescription lens.

Furthermore, these "Super Stores", to be profitable, require a constant stream of customers as they promote "one hour" service, and generally have highly paid technicians just waiting for orders to keep their machines operating at full capacity.

As a result of this phenomenon, most opticians, optometrists and/or ophthalmologists are losing their customer base and have had their earnings seriously eroded.

More recently, however, there has been an attempt to introduce the "mini-lab" to the optician/optometrist, and/or ophthalmologist. This is a direct attempt to bring in-house "one hour" capability of making lenses directly to the source who fills the prescription lens.

One such organization in this field was Vision Sciences of Monrovia, Calif., who marketed an in-office lens casting system employing a choice of resins, such as Master Cast 1.5 clear resin, Master Cast 1.50 with UV protection and Master Cast 1.56 High Index with UV protection. Such a system was capable of casting plastic lens whose styles include single vision, progressive bifocals, flat top 28 or 35 bifocals, Round Seg 28 bifocals, flat top 7×28 bifocals, flat top 7×28 trifocals; and whose base curves are 2,4,6 or 8 with lens diameters of 72 mm, 75 mm and 80 mm. This Formalens system was of modular design and embodied a generally large work station incorporating a number of mold storage modules, a resin dispenser, and casting and curing stations. With cure cycles varying from 3 to 16 hours, the customer or patient must usually return a second time to complete his order for new prescription lenses. Such an overnight timetable in reality reduces such "one hour" service to "one day" service at best.

In addition, a deionized, laminar air flow unit is necessary in order to provide a static-free, dust-free area in order to ensure fabrication of clear, sharp spectacle lenses. Such "Method of Choice" plastic lens production systems for office use as marked by Vision Sciences were known as Model numbers 2001 and 2002 and ranged in cost from about $27,000 to $63,000, excluding the cost of optional equipment, such as ultrasonic cleaning units and extended range molds that include higher powers and a wider selection of adds.

Such min-labs are not only very expensive to purchase, but their cost of operation is also costly. In fact, the casting process is laborious since about half of same is "science" and half is "art". As a result, the scrap rate or rate of rejection is very high. This is due to the fact that the optician, optometrist, and/or ophthalmologist is not an expert manufacturer, and lacks sufficient skill and training despite the fact that all purchasers of such Fomalens System had to undergo a lengthy and expensive training program at Vision Sciences' home office in order to be able to properly operate the system. It is so complex it required a 100 page operator's manual in order to learn how to operate the system. All of these disadvantages have over the last few years brought on a definite need for an improved and better system.

Another similar type lens casting system was marketed by Techna Vision of San Diego, Calif., but this company is no longer believed to be in business either. It is believed that the casting systems developed by both Techna Vision and Vision Sciences involved considerable difficulty due to the complexities of the casting systems employed. The experiences have been negative and, in reality, failures.

OBJECTIONS OF THE INVENTION

It is the primary objection of the present invention to provide novel lens blanks and to an improved process or method for the manufacture of ophthalmic lenses in virtually minutes.

It is yet another object of the present invention to provide a more simplified, and less expensive means of fabricating relatively expensive lenses, such as multifocal lenses in house in the shortest possible time so as to eliminate the need for a customer to wait longer than a few minutes or to make a return or second trip to the optician, optometrist and/or ophthalmologist's office.

A still further object of the present invention is to provide an improved novel method of cold flowing and/or compression molding a preheated, predetermined lens blank of thermoplastic material into a lens virtually within minutes, so that one can obtain a pair of prescription glasses in a single, relatively short visit to the optometrist, optician and/or ophthalmologist.

SUMMARY OF THE INVENTION

In summary, the invention pertains to novel lens blanks, and to an improved method for making thermoplastic lens by first placing a preheated lens blank on the lower mold of a preheated pair of lens molds prescribed for the desired lens prescription; the preheated lens blank of thermoplastic lens material having first been heated to a temperature point below its softening point, but being able to retain its original lens blank shape. The molds may also be preheated to about a temperature at which the lens blank is heated as same facilitates production; thereafter closing the lens molds and pressing the molds toward each other and against said lens blank to immediately size down the lens blank to its "finished" lens size in virtually minutes. The method steps more particularly involve the steps of after first having the upper mold make contact with the preheated lens blank positioned in the preheated lower mold, and then initially compressing the lens blank at a predetermined, programmed rate of speed, whereby the lens blank is compressed and spread out into the mold cavity. Such predetermined programmed rate of speed varies depending upon the lens materials employed. For example, with a polycarbonate lens material, the upper molds decent is at a rate of speed of about 0.1 mm per 3 seconds which is maintained all the time while compressing and spreading the lens blank.

Once such a lens blank has been compressed to within about 4 mm of a predetermined thickness desired (determined by the thickness of a lens' prescription), then the lens blank which is spread over a significantly larger mold area (with attendant greater heat transfer), the predetermined programmed rate of speed is increased so that the upper mold descends about 1 mm per 3 seconds which significantly accelerates the lens forming cycle.

When the desired, programmed lens thickness is achieved, the movement of the top mold is halted, and also the mold heating is discontinued. Cool air is then circulated over the molds.

After the molds have reached a predetermined "cool" temperature (about 150° F.), the molds are opened, and the finished lens is removed. All that remains is for any flashing, which may be formed about part of or the entire periphery of the lens, to be suitably removed by conventional techniques.

It should be appreciated that with the improved method of the invention, the molding cycle is programmed to have the molding machine compress the lens blank by forcing the molds to approach one another at a fixed rate of speed irrespective of the pressure required. Here, the pressures exerted during the first part of the molding cycle (speed of about 0.1 mm per 3 seconds) range from about 15 lbs. to about 50 lbs. This, of course, depends to a large extent on the heat transfer to the lens blank which in turn depends upon the mold temperature as well as the temperature and shape of the lens blank preform. In addition, with the method of the invention, the pressure "generated" during the second part of the cycle (speed of about 1 mm per 3 seconds) may go as high as 600 lbs. or more depending upon the temperature and mold shapes, as well as the temperature and shape of the lens blank preform.

BRIEF DESCRIPTION OF THE DRAWINGS

The foregoing and other objects, features arid advantages of the present invention will become readily apparent to those skilled in the art from a reading of the detailed description hereafter when considered in conjunction with the accompanying drawings wherein:

FIG. 1 is a side elevational view of a typical disc blank of the prior art which must be finished to size for all prescription lenses;

FIG. 2 is a concave-convex lens blank of the invention;

FIG. 3 is a plano-convex lens blank of the invention;

FIG. 4 is another plano-convex lens blank of the invention, but with a flexible scratch resistant coating on both sides thereof;

FIGS. 5 and 6 are vertical sectional views showing a typical pair of molds for use with my novel plano-convex blank and improved method for providing in minutes a finished multi-focal ophthalmic lens from the preformed novel plano-convex lens blank (initial and final positions shown);

FIGS. 7 and 8 are similar vertical sectional means showing a like pair of molds for use with my novel concave-convex lens blank and improved method for providing in minutes a finished multi-focal ophthalmic lens from the preformed novel concave-convex lens blank (both initial and final positions are also shown);

DETAILED DESCRIPTION OF THE PREFERRED EMBODIMENTS

Figure 9:
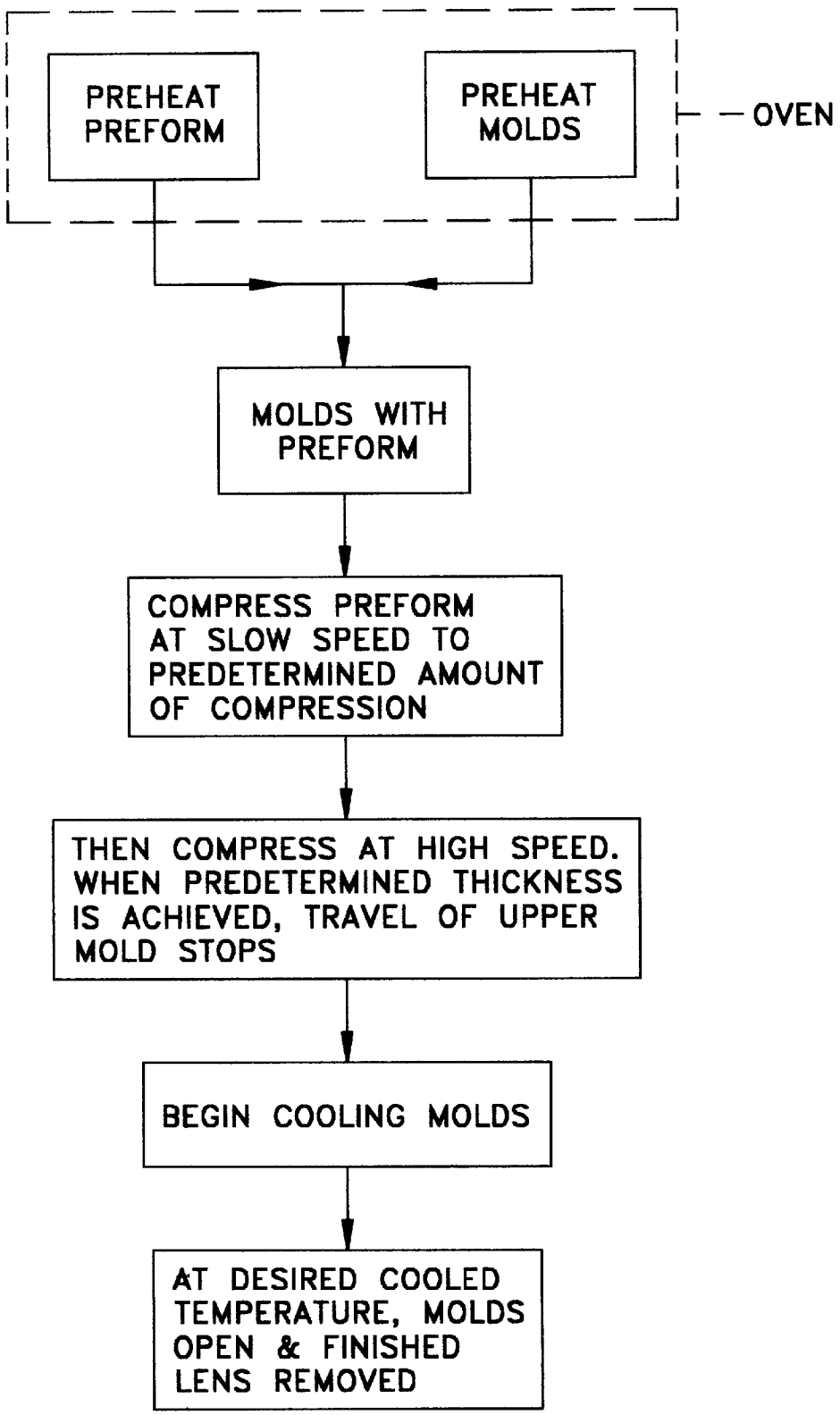
FIG. 9 is a flow diagram illustrating my improved method of making a lens with my novel preforms.

Referring now to the drawings, and in particular to FIGS. 1–9 and 12, there is shown a prior art lens blank in FIG. 1, and my novel preheated lens blanks in FIGS. 2 and 3, as well as a work station and flow chart showing my improved method for making a prescription lens. As shown therein, a substantially finished prescription lens is made in a pair of preheated predetermined molds (top 10 and bottom 12) having desired curve surfaces (not shown) for the opposite sides of the finished lens 18 or 18'. The lens 18, 18' is formed from a single, partially formed or shaped preformed lens blank 20 or 20' (the concave/convex or plano/convex shown in FIGS. 2 and 3, respectively) made of plastic material, preferably a thermoplastic resin material, such as polymethly/methacrylate, polycarbonates, polystyrene, cellulose acetate, acrylic copolymers, thermoplastic polyesters, styrene acrylonitrile (SAN), and/or mixtures thereof. Suitable specific thermoplastic materials of such resins and their U.S. trademark names are for the polycarbonates, Lexan and Makrolon, respectively, made and sold by G.E. Plastics of Pittsfield, Mass. and Mobay Corp. of Pittsburgh, Pa. (now called Bayer); for the acrylics, Plexiglass and Acrycal, respectively, made and sold by Rohm & Haas of Philadelphia, Pa. and Continental Polymers of Compton, Calif.; and for the cellulose acetate, Tenite made and sold by Eastman Chemicals, Inc. of Kingsport, Tenn. The edging of the lens 18, 18' may be suitably finished by special edging equipment, and the finished lens may then, if desired, be suitably treated with one or more coatings, such as a scratch resistant coating and/or suitably tinted or dyed for prescription sunglasses. Other coatings, such as anti-glare (polarizing lens), photochromic, anti-reflective and the like may also be employed in the practice of the invention.

Alternatively, for example, the scratch resistant coating 22 may be applied first to the preformed lens blank (one or both sides, as shown in FIG. 4), since the improved inventive molding process or method is very brief and/or abbreviated with my preformed lens blank, the method does not destroy or damage the coating in any way, so long as the coating(s) have sufficient flexibility so as not to crack. Also, it renders the method of the invention that much more user friendly insofar as the overall operation of the lens making process is concerned, and the fact that such coating step no longer needs to be done by another vendor or by the optician. With the improved method of invention, the lens can be fabricated from other suitable lens materials, such as made from an acrylic resin, so long as the material used is a thermoplastic in contrast to the that of a thermosetting material. The molds are suitably secured to and seated on the upper and lower mold supports 24 and 26 (only bottom supports shown in FIGS. 5–8), and the pair of molds perform the compression molding and pressing of the novel lens preform blank of plastic material into the desired shaped prescription lens formed by the two mold halves. The mold halves may be changed manually or suitably semi/automatically, and one may position the desired lens blanks 20 (plano/convex), or 20' (concave/convex) on the bottom mold 12 when a concave/convex lens, such as 18 or 18' or even the bifocal lens 30 (see FIGS. 6 or 8, and 10–11, respectively) is to be fabricated. Also, one can form a double convex lens in like manner using molds having he double convex shape and employing a preform of the double convex shape which makes point contact on each side.

The molds 10 and 12 have hollow cavities (not shown) and are suitably fluid heated, and also cooled, preferably by air entering inlets and exiting outlets on the mold bases (both not shown) after a lens is formed by the molds. See, for example, the molds of my earlier filed and issued U.S. Pat. No. 5,368,790 which is incorporated herein by reference in its entirety. Other cooling means, such as by blowing fresh air over the molds may be employed, if desired, although such means requires more time to cool the molds and finished lens to room temperature. Cooling of the molds whether by air or water is important as the lens 18 may not be released safely and cleanly from the molds 12 and 14 without such a complete cooling operation which enables the handling of a finished lens without harming or burning oneself by the handling of a "hot" preform and/or finished lens.

It will also be appreciated that the molds 10 and 12 are preferably heated by hot air using well known heating equipment designed for the rapid heating up of an object, such as a metal part. The hot air temperatures are accurately controlled by suitable temperature gauges or sensors (not shown) on the molds which are wired to the control console 29 so that same can then be observed and monitored, as is well known, and conventional in the heating art. Alternatively, the molds could also be heated by means of electric heating bands (not shown) wrapped about the molds 10 and 12, and suitably connected electrically by means of power cords or lines to a convenient power source which may also be suitably controlled by the same apparatus means. The molds being heated by a fluid may be either of the conductive or convective type. In addition to conductive heating and/or radiation heating, radiation heating may be either of the infrared or of the dielectric type. In a like manner, the molds are suitably cooled as is required for early removal of the finished lens.

For example, a conventional, and suitable control console for the heating apparatus employing hot air for the rapid temperature built up of an object's temperature, such as the preformed lens blank and/or molds, is made and sold by the U.S. manufacturer, identified by the tradename of Industrial Devices Corporation. A suitable temperature gauge 25, such as Model GM made by the U.S. Sensotec Company may be employed in the control console 29 (see FIG. 12). The apparatus also includes hose ducts as shown therein for funneling both the hot (and cool) air to base mounts 24 and 26 for both the upper and lower molds, 10 and 12 respectively. The heated mold base mounts conduct heat directly to the molds which are suitably secured in place and in contact with the mold bases.

Lenses produced by the novel method of the invention, and using the preformed lens blanks of invention require no further finishing operations, other than an edge treatment, if necessary to remove any flashing, and the application of one or more surface coatings, such a hard scratch resistant surface coating, and/or a tinting treatment.

Figure 12:
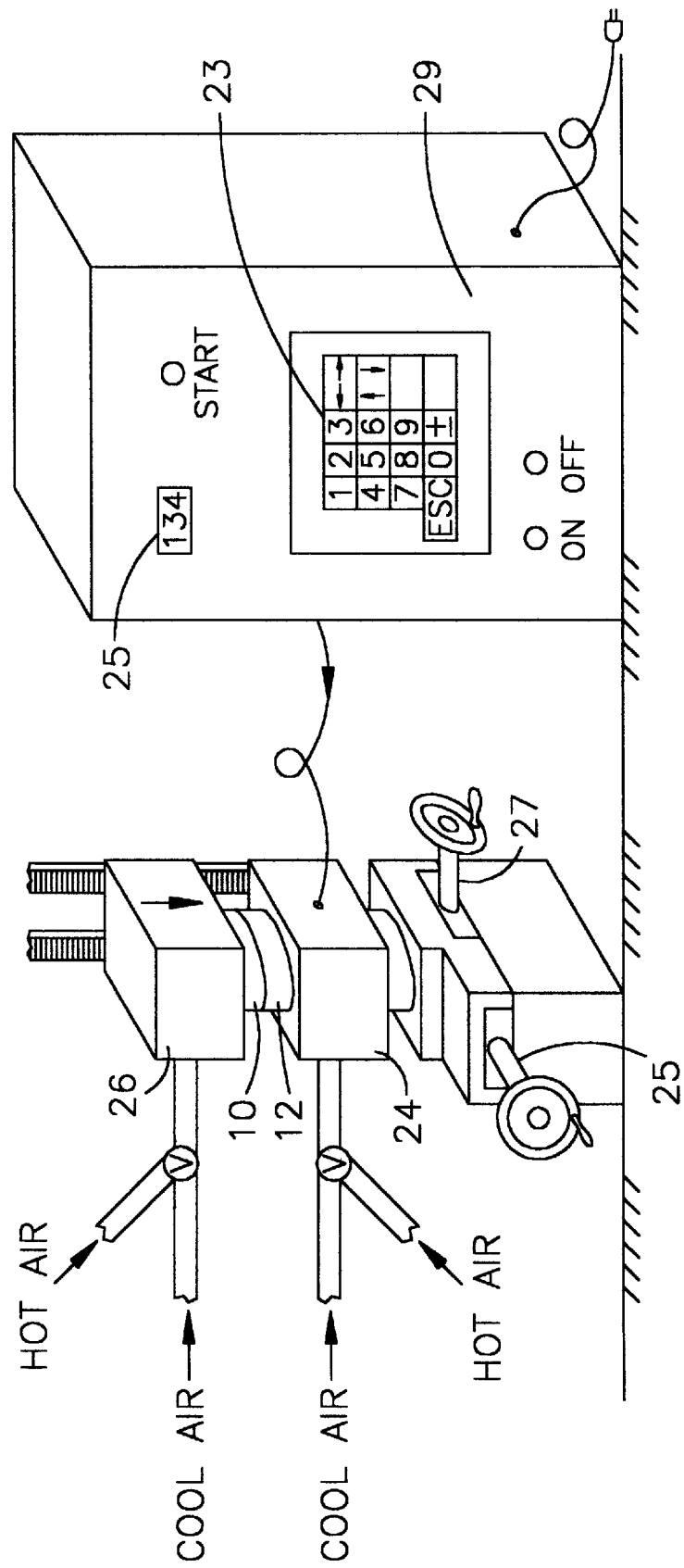
FIG. 12 is a diagrammatic illustration of a work station showing a pair of closed molds containing a preformed lens blank compressed to a finished form, and with an apparatus, and associated controls for heating up the molds, and for programming the rate of speed at which the upper mold descends on the preform to compress same to a desired finished lens.

A typical lens work station employing the apparatus for heating and pressing the preforms is best shown in FIG. 12. With the use of conventional or predetermined mold halves 10 and 12 for making a prescription lens, a predetermined number of inventive lens blanks are preformed and is referenced to a standardized set program for corrective lenses, and such corrective lenses would include those for decentration or prism/wedge effect (movement of optical center from geometric center), and other more specialized prescriptions. The user of the method thus selects the desired thermoplastic lens material, and the specified preform lens blank required, and suitably places the predetermined mold halves offset in the mold base mounts, or otherwise located to achieve any desired decentration or particular lens configuration desired. At least the bottom mold base mount is suitably adjustable in the X and Y directions (plane of mold) by conventional (rotatable) "lead" screw means 25 and 27, and guideways (not shown) as is well known in the art. Once the molds are centered with respect to each other, the preform is then positioned and essentially self-centers itself on the lower mold due to the curved lower mold and the curvature on the preform itself. Once the molds and preform are preheated, and the machine is set up with the preform in place, and the predetermined given parameters set, the method cycle commences by pressing the start button. Within a few minutes, the two step process is complete and the molds open for removal of the finished lens.

Thus, one can achieve with the novel method of the invention a finished ophthalmological lens as shown by the various method steps marked up on the flow chart of FIG. 9 for just about any type of corrective lens, be it a bifocal, monofocal, trifocal, multifocal or other type of corrective lens. The flow chart of FIG. 9 is believed to be self-explanatory and illustrates the various operative steps from top to bottom in order of their use in the practice of the method of the invention.

The lenses are formed very fast (virtually in a few minutes) and without any air bubbles or entrapped air due to the compression molding of the thermoplastic preformed lens blank, and the finished fabricated lens can be immediately assembled (after an edge removal step which may be necessary should flashing be observed) into an eyeglass frame for the patient without the need to set up a return date with the patient so that the finished lens may be placed in the eyeglass frame. Generally, only about two minutes are required to bring the upper mold down all the way, and about one-half minute for cooling the finished lens.

It is important with the improved method of the invention to utilize a moldable thermoplastic material which can be heated and squeezed into the required shape. On average, a typical lens made by the improved method of the invention can be made in a very short time, i.e. time is reduced significantly, even when compared to my earlier continuation-in-part method wherein the time was reduced by about 90% as compared to the one-half to one hour previously required when a lens is made in accordance with the teachings of my grandparent patent application (now U.S. Pat. No. 5,368,790, granted Nov. 29, 1994).

Any type of lens can be fabricated by the improved method of the invention, provided that prescription lens molds form part of one's stock and inventory of molds. In this regard, the front and back molds form a set for any desired lens configuration or prescription as well as lens size, (i.e. 75 mm diameter). Generally, one would employ molds with diopter power increments of 0.25 (plus or minus) so that all prescriptions can be covered with the front and rear mold set configurations. The combinations of mold sets should cover substantially all standard or routine prescriptions, including monofocals, multi-focals, such as bifocal and trifocal, round, single vision, etc. (for example, bifocals have various base curves, with bifocal reading segments of different sizes and shapes, and many segment curves for the bifocal additions).

The molds may be made of highly tempered glass, such as a pyrex glass, or preferably, of metal. They contain curves of different radii ground and polished into their smooth optical surfaces. Both molds need not necessarily be of the same material. In addition, the different curves or radii in a surface produce the corrective "power" to the finished lens formed by a mold set (be it a bifocal or trifocal, etc.). The edges remain unfinished and must be trimmed or ground down to the lens diameter or size required to fit the eye cutouts of a frame. Also, the two molds may be suitably spaced apart according to the edge thickness desired. There is also no need for any type of gasketing means to stop the flow of material from slipping out from between the molds, as is required in casting of lenses using well-known conventional processes developed and used all before any of my inventions since my first filed grandparent case noted hereinbefore as U.S. Pat. No. 5,368,790 which was filed back on Aug. 19, 1992.

The lenses made by the present invention are compression molded and suitable calibrating means which are well-known to those skilled in the art are used to form whatever decentration the lens is required to have along with the desired optical quality surfaces and powers prescribed. Once a lens is fabricated and removed from the molds, only the edge flashing need be removed, and this can be done after tinting and/or a hardness coating is applied. With the improved method of the invention, grinding and polishing of the optical surfaces is eliminated. It will be appreciated that the scratch resistant coatings can be applied either before molding or after molding, and to one or both sides of a lens, and that many such coatings comprise a base of silica. Some of such coating materials are available from the following manufacturers and/or suppliers. These are identified hereinbelow as SHRES MSE 100 by Walker Silicone of Adrian, Mich.; SHC-130-13 or HT 470 D or, SHC-NT 50 by Lens Technology of Ceritos, Calif.; HT 450 by Coburn Company of Muskegee, Okla.; UVHC 8555 by General Electric of Waterford, N.Y.; HC-8H by Fastcast of East Meadow, N.Y.; and HP-92 by GM Nameplate of Seattle, Wash.

During the method of compression forming the lens, no air bubbles or entrapped air of any kind are formed in the lens. Any such lens would be defective if it included air bubbles or entrapped air. The preheating of lens blank and molds, and the subsequent continued heating until the desired programmed lens thickness is achieved are necessary to maintain and form the soften preformed lens blank. The compression molding of the inventive method forms the lens without the formation of air bubbles or entrapped air in the lens. It will be recognized that the preform lens blank are basically of two configurations. One of which may have a top side (in contact with a convex mold) of convex, flat or concave configuration so long as the curve surface is flatter than the curve of the convex mold. The other or bottom side of the preform (in contact with a concave mold) cannot be flat or concave. It must be convex but its curve must be steeper than the curve on the concave mold.

The inventive method, while not directly embodying the well known software designed to specify by calculation and computation stock molds or sets of molds necessary to form a prescribed lens prescription, same may be employed so that the user is able to specify the molds required. The preformed lens blank chosen depends on whether one requires a (−) lens or a (+) lens. The lens blank size is a function of the size of the lens desired and one which produces the least amount of flashing. Also, the diameter of the preform should be smaller than that of the lens required so that excess thermoplastic is squeezed out of the molds, and the preform must have a center thickness larger than the finished lens thickness otherwise it would not be squeezed out. With suitable computer means which are commercially available, one also is able to have specified as controls in the lens fabrication the two speeds, and the center distance desired to be achieved in fabricating a particular prescription lens. The two step rate of speed (slow and then high) of the molds as well as the maintenance of the temperature and cooling requirements may be specified and/or programmed as well as the mold temperatures in the control console at the time commencement of compression of the preform in the mold press is initiated. It will also be understood by those skilled in the art, one may also manually meet the prescription requirements of the molds, preform size, weight, settings of the control apparatus, etc. by predetermined calculations and using suitable available charts showing the values required. Such information and/or data could then be alternatively manually entered into the process controls along with the particular molds required, in lieu of semi or an automatic setting, including suitable means for retrieving the specified molds and positioning and suitably securing them directly on the mold support 24 of the bottom mold and on the upper mold support 26 or directly to the ram or piston (shown by the downward directing arrowheads) which brings down the top mold onto the lens being formed. Such arrangement is diagrammatically shown for convenience in the illustration of FIGS. 5–8, as well as the FIG. 9 which shows a complete flow chart or diagram illustrating the various steps involved in the improved process or method of the invention from preheating to cooling and removal of the finished lens. It will be appreciated that the "weight" of the preform is a function of lens size thickness and prescription, whereas pressure and heat or temperature required to mold the lens is primarily a function of the lens material. For example, the weight of a plano lens (no correction needed) 65 mm in diameter and 0.175" thick is 15 grams so preform weight would be slightly larger to insure full mold coverage and adequate flash about the entire lens periphery (the flash serving to grip the lens for further treatment, such as coatings, tinting, prior to its removal).

Figure 10:
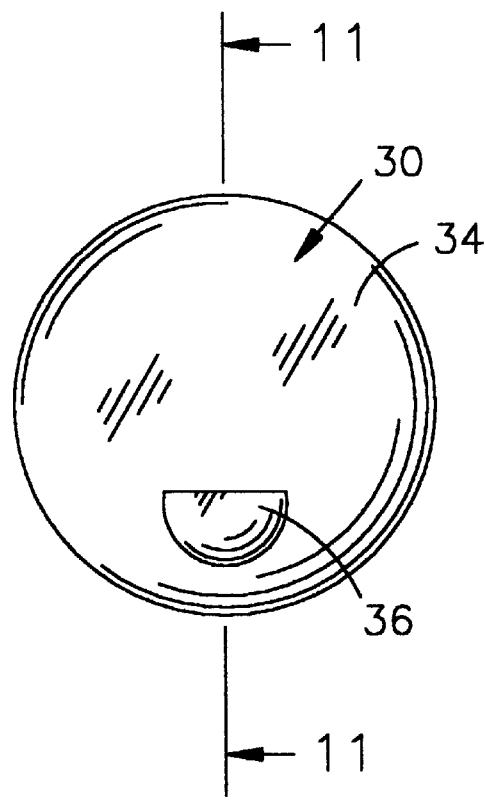
FIG. 10 is a typical lens (bifocal) made in accordance with the invention.
Figure 11:
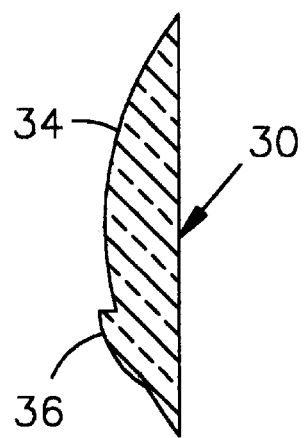
FIG. 11 is a cross-sectional view of the lens of FIG. 10, taken along the section line 10—10 of FIG. 7.

A typical lens capable of being fabricated by the improved method of the invention is shown in FIGS. 10 and 11. As illustrated therein, the lens 30 is comprised of areas 34 and 36. Area 34 is the major surface for distance viewing and minor surface 36 of the bifocal lens is formed to the curvature desired for near viewing or the reading portion of the lens.

Typically, for generally any given lens prescription, manual computations using industry prescribed charts or desirably computer program calculations can be specified for identifying what conventional "stock" molds are to be retrieved from storage, and used to fabricate the lens prescription by the improved method of the invention. In addition, preform choice and/or size is identified by size of lens required, and the material may be suitably specified as well or simply chosen by the patient and/or his or her eye doctor, etc. It will be appreciated that with the improved method of the invention, the molding cycle time is all now in this improved invention always the same (including temperature and pressure) as the compression molding of a finished lens is clearly much more simpler, although the cool down time is about the same as heretofore in my earlier related patent applications.

In operation, the molds are initially checked for scratches or any other imperfections or faults, as they must be clean and exhibit highly polished surfaces and set-up in the heated press. A preformed lens blank of the desired lens material is first preheated to a temperature just below its softening point. This can be done in a suitable oven (see FIG. 9) or together with preheating of the molds. Then, the preform which still has its original shape is placed or positioned mechanically on the bottom mold, and the preform used must make preferably either a point or line contact with the mold halves so as to ensure a compression flow patent which eliminates air bubbles or pockets of air trapped in the finished lens. Such predetermined shaped preform as shown in FIGS. 2 and 3, while being as close as possible to the shape of most configured prescription lenses, ensures that there can be no air bubbles or entrapped gases or air in the compression molded lens. While the compression speed rate is continuously applied and maintained on the preheated preform, the preform temperature is also continued and maintained. It will also be appreciated that the lens blank of FIG. 2 is used for making a minus (−) lens, whereas the lens blank of FIG. 3 is used for making a positive (+) lens.

As noted hereinbefore, the molds are preheated from room temperature to a temperature of about 370° F. when using a polycarbonate preform, whereas the preform is heated to about a temperature of 300° F. In the case of an acrylic or other thermoplastic material as the preform, the temperatures are different, but generally of like differential. Also, with the improved method of the invention, the pressure "generated" during the high, accelerated or second part of the cycle where the speed of compression is about 1 mm per about 3 seconds, can go as high as 600 lbs. or more depending upon shape and mold temperature as well as shape and temperature of the preformed lens blank. Also, the preform is initially preheated to a temperature which does not melt the preform, but which is just below its softening range. In this way, the preform can be handled for transfer to the molds, at which time there may be a small drop in temperature due to the transfer operation. Alternatively, as shown in FIG. 9, both the molds and preform can be heated together as a unit. Also, it should be noted that the pressure is no longer a major factor in fabrication of a finished lens, and that all that is necessary is the compression of the preform once it reaches its softening point in the molds so that the preform begins to flatten out totally to take the shape of a finished lens between the mold halves. In fact, for example, with a polycarbonate lens, pressure in the first half or cycle of the inventive method is only about 15 lbs to about 50 lbs, but in the second half or cycle the pressure can go as high as 600 lbs or more. It should also be noted that the preform is in effect pre-sized to the shape of a finished lens, and the little compression achieved in the two-step method of the invention quickly sizes the preform down to size.

Note that prior to compression molding, any decentration (prism or wedge effect) required would be made by suitable conventional means (not shown) which would move the optical center of the lens from the geometric center. Such known means either moves one mold axis with respect to the other mold axis or cocks one mold on a desired slight angle (slant or wedge) to achieve the same decentration effect. Such X and Y and/or tilt mechanisms are conventional and well known in the art and thus not further discussed herein.

More particularly, with the novel method of the invention, once the preform lens blank and molds are preheated, the former if a polycarbonate is heated to about 300° F., and the molds to about 370° F., the preheated preform is placed in the lower preheated mold, and the top mold is lowered so as to have the top mold just make contact (line or point) with the preform.

Then the initial or first molding step of the process commences where the top mold advances downwardly at a programmed rate of speed of about 0.1 mm per 3 seconds, all while compressing and spreading the preform. When the preform has been compressed to within about 4 mm of the desired thickness (of such prescription lens being made), the preform at this point in time is spread over a significantly larger mold area and thus has greater heat transfer; and the molding cycle then changes to speed up the lens fabrication and increase the rate of speed of the downward motion of the top mold in the second step to about 1 mm per 3 seconds (about a ten fold increase). When the desired lens thickness is reached (preprogrammed as a limitation into the computer operated heat/control and pressing apparatus), the top mold is stopped, and the heat (hot air) to the molds is shut off. Cool air is then circulated over the molds by any suitable means, including the use of the illustrated ducts or hose lines shown in FIG. 12 to circulate cool air in lieu of hot air onto the molds. Once the molds have reached a predetermined "cool" temperature of about 150° F., the molds are suitably opened and the finished lens is removed for further processing or fabrication into a lens frame (not shown).

It will be appreciated that upon preheating of the novel preform and molds, the improved process of the invention subsequently embodies a two step molding cycle which first compresses the preform lens blank by forcing the molds to approach one another at a fixed rate of speed of about 0.1 mm per 3 seconds irrespective of the pressure required for the lens blank. Here in fact the pressure actually ranges from about 15 lbs to 50 lbs, and this to some extend depends on the heat transfer to the preform which in turn depends on the mold temperature as well as the temperature and shape of the preform. In the second step or part of the two step molding cycle, the cycle speed is set to about 1 mm per 3 seconds and the pressure resulting therefrom may go as high as 600 lbs or more depending on the temperature and shape of the molds, as well as the temperature and shape of the preform.

With the novel method of the invention, it must be recognized that lens blank configuration where a top side thereof is in contact with a convex mold, the top side can have a convex, flat or concave configuration, provided the curve is flatter than the curve of the convex mold itself. In a situation where the bottom side of the preform is in contact with a concave mold, the bottom side cannot be flat or concave, and it must be convex, and its curve must be steeper than the curve of the concave mold.

With the improved method of the present invention, there is no air bubbles or entrapped air in the lens as only point and/or line contact is made with the specifically shaped preformed lens blanks employed. Also, no walled mold is needed as the preform of the present invention is not liquified nor is the material plasticized in any way as is the case with the prior art method and apparatuses as described and shown in FIGS. 11A and B and 12A and B of my earlier filed aforementioned grandparent patent application (U.S. Pat. No. 5,368,790). In fact, to do so would defeat the purpose of the invention and melted material would shoot out from between the molds and/or cause air to start to become entrapped in the liquid mass. Bear in mind that melting and/or plasticizing of any resin material causes the melt which is under tremendous pressure to squirt and leak out of the molds. Such problems are ever present in such prior art systems as it is very analogous to the conventional injection molding system of molding plastic parts.

From the foregoing, it can be seen that with the novel preformed lens blanks and the improved method of making a lens disclosed herein, prescriptive and/or design requirements for most, if not all, ophthalmic and other plastic multi-focal lenses encountered in the field may be produced inexpensively, and very fast (less than a few minutes), with exceptional precision and efficiency by the optometrist and/or ophthalmologist. This is attributable to the present novel process for producing lens from stock molds, and novel lens blanks which require no grinding processes, and which system avoids the need for a high degree of technical knowledge and skill in the operation of the method of the invention. It should also be appreciated that the improved method of the invention may be applicable to other types of lenses, such as those used in scientific equipment or in other optical devices.

Thus, so long as the material for such lenses are thermoplastic and capable of compression molding without degradation, it would appear practicable to use the improved method using special molds to fabricate such lenses by the improved method of the invention. For example, using a polycarbonate lens material, and without preheating my prior disclosure of a spherical preform, it took about 28 minutes to fabricate a lens. On the other hand, with the new and improved preformed lens blanks, the preform was preheated to about 300° F., and then placed in the molds, a finished lens was made virtually instantly in less than a few minutes.

The shape of the preform lens blank is important for a number of reasons. First, and foremost of all, the preform should be of a shape which totally eliminates any chance of air bubbles or entrapped air from becoming entrapped in the lens during the compression molding of same. In addition, the closer the preform is to the desired finished lens, the faster the preform is finally molded into a finished lens as movement of the mass of material is less and the heat transfer from the molds is fastest through the shorter distances across the preform thickness. Moveover, with a preheated preform and molds, the preform is smashed down in minutes (less than a few), and this also contributes to faster heat distribution as point or line contact quickly becomes almost full mold surface contact. The preferred preform shapes are shown in FIGS. 2 and 3 for use with the invention, but the double convex form of blank is even more preferred. It will be appreciated that my prior applications employing spheres as preforms require maximum movement of the mass of material forming the preform, and thus it takes in my prior related patented method(s) considerably longer to transfer the heat throughout the spherical shape of the preform during the preheating stage. Also, in contrast thereto, lens blanks used with conventional processes of grinding the lens surfaces essentially all have a concave-convex form. Such a form could not be employed in the practice of the present method invention as the concave shape lends itself to entrapping air in pockets as the lens is formed between the molds. Moreover, most prior art lens blanks are made of thermosetting materials which cannot be compression molded upon heating. Accordingly, with the improved method of the invention, the preforms are made of a thermoplastic material, and it must always have smaller radii than that of any concave molds used to make a lens with the improved compression process or system of the invention. More specifically, other than a solid, flat disc and/or spheres which form the preforms known heretofore and described in my earlier parent application(s), the improved preforms of my improved patent applications must have a configuration where the top side (in contact with the convex mold) has a convex, flat or concave configuration so that its curve is flatter than that cure of the convex mold; or a configuration where the bottom side of the preform (in contact with the concave mold) cannot be flat or concave; and it must be convex, but its curve must be steeper than the curve on the concave mold. In addition, the preform must be of a predetermined weight in order to yield a desired prescription lens of a particular diameter (small, medium, large, etc.). Also, the diameter of the preform must be smaller than that of the lens to be made, so that some minimum thermoplastic material is compressed out from between the mold halves, and the preform must have a center thickness thicker than that of the finished lens as it otherwise would not be compressed at all. In this connection, it will be recognized that the process includes reference to a computer program that not only specifies what preform and mold sizes one should use for fabricating conventional prescription lenses, but what center distance the process should end up with between the pair of molds. With knowledge of the set center thickness of a particular prescription lens, and that of the known preform size and the preform center thickness itself, it can be readily ascertained what will be the total compression distance during fabrication of a finished lens. Also, generally speaking with the same diopter power increment of plus 1, the larger the lens diameter, the greater the weight of the preform necessary to make such a lens.

It is also within the scope of the present invention to embody a laminate for the preform. For example, the preform may be coated or layered suitably with a 2 mil polycarbonate film, and have on top thereof a suitable scratch resistant coating or an anti-reflective coating or a polarizer or a photochromic surface layer. Thus, while the preform laminate may comprise the above five sections; one could dispense with the layers on one side thereof leaving only a three sectioned laminate where one side of the preform is untreated. However, where any finished coating, such as anti-reflective, photochromic, polarizing, etc. is desired on a preform, it preferably includes a polycarbonate film/layer between itself and the preform so as to completely fuse together as a unit. In any case, the scratch resistance coatings on either side of a lens preform would normally be the outer surfaces, although the other optional coatings could be applied thereto without sacrificing any performance characteristics.

Although the present invention has been described in some detail by way of illustration and example of purposes of clarity and understanding, it will, of course, be understood that various changes and modifications may be made with the form, details, and arrangements of the parts without departing from the scope of the inventions as set forth in the following claims. For example, where a convex/convex preform is employed to make a finished lens, its curved surfaces must be steeper than the curves on the molds in which the preform is placed and positioned for molding. In this way, there is always assured a point contact which is critical for fabrication without fear of air bubbles or entrapped air in the finished lens product.

What is claimed is:

1. A method of substantially manufacturing instantly a prescription lens, for eyeglasses on site by compression molding, in a pair of upper and lower molds having mold surfaces from a thermoplastic preform lens blank, having opposite surfaces and a periphery, comprising the steps of:

preheating said preform at a first temperature and preheating said upper and lower molds to a second higher temperature;

positioning said preheated preform between said upper and lower preheated molds such that said preform makes a single point or line contact with each of said mold surfaces;

initially compressing said preformed at a first fixed rate of speed regardless of pressure exerted on said preform, with said preform being compressed to about 4 mm of a predetermined lens thickness desired for said prescription lens;

finally compressing said preform to a substantially finished prescription lens at a second fixed rate of speed substantially higher than said first fixed rate of speed regardless of pressure exerted on the preform while substantially maintaining a predetermined temperature on said preform, and shutting off heating of said molds, and stopping travel of said molds with respect to each other upon reaching said predetermined lens thickness; and cooling said molds to another temperature lower than said predetermined temperature; and thereafter opening said molds so as to remove said finished prescription lens;

whereby said prescription lens is made within minutes without any air bubbles or entrapped air, leaving only flashing to be removed prior to fitting said prescription lens to an eyeglass frame.

2. The method according to claim 1, wherein the higher rate of speed of said final compressing step is ten times that of said first fixed rate of speed.

3. The method according to claim 1, wherein said preform is made of a polycarbonate.

4. The method according to claim 1, wherein said first fixed rate of speed is 0.1 mm per 3 seconds.

5. The method according to claim 1, wherein said higher rate of speed is 1 mm per 3 seconds.

6. The method according to claim 1, wherein said molds are cooled and opened at a temperature of about 150° F.

7. The method according to claim 3, wherein said preform is preheated to about 300° F., and said molds are preheated to about 370° F.

8. The method according to claim 1, wherein said preformed lens blank is provided with a coating or laminate on at least one side thereof.

9. The method according to claim 8, wherein said coating or laminate is a thermoplastic material.

10. The method according to claim 8, further including a second coating or laminate disposed on top of said first coating or laminate and is selected from the group consisting of scratch resistant, anti-reflective, photochromic and polarizing.

11. The method according to claim 8 wherein said preform lens blank is a polycarbonate, and said first coating or laminate thereon is selected from the group consisting of scratch resistant, anti-reflective, photochromic and polarizing.

* * * * *